United States Patent Office 3,793,271
Patented Feb. 19, 1974

3,793,271
ACCELERATOR COMBINATION FOR
EPOXY CURING
Norman Bell Godfrey and Floyd Edward Bentley, Austin, Tex., assignors to Jefferson Chemical Company, Inc., Houston, Tex.
No Drawing. Filed July 28, 1971, Ser. No. 166,995
The portion of the term of the patent subsequent to Feb. 8, 1989, has been disclaimed
Int. Cl. C08g 30/14
U.S. Cl. 260—18 PN                      11 Claims

ABSTRACT OF THE DISCLOSURE

Use of an accelerator-hardener composition containing salicylic acid, N-(3-aminopropyl)piperazine and a polyamide provides a synergistic curing effect for setting polyepoxide resins. The accelerator-hardener composition provides unexpectedly rapid low temperature curing. Solventless coatings of an epoxy resin cured with our accelerator-hardener composition are smoother, glossier and freer from blush than coatings prepared without the accelerator-hardener composition.

---

This invention broadly relates to the cure of epoxy resins. In one aspect this invention relates to an improved process for accelerating the cure of epoxy resins cured with a polyamide. A further aspect of our invention relates to a curable epoxy resin composition and to cured coatings produced therefrom which are characterized by their smoothness, glossiness and freedom from blush.

Epoxy resins have heretofore been cured with the polyamides formed from polymeric fatty acids and polyalkylenepolyamines which this invention employs. U.S. Pat. No. 2,705,223; Floyd, D. E. et al., Modern Plastics 33 (10), 238 (1956); and Floyd, D. E., Polyamide Resins, Reinhold Publishing Company (1958), representatively describe use of suitable polyamides. Their disclosures are hereby incorporated by reference thereto.

Of further general interest is U.S. Pat. No. 2,965,609 which relates to curing polyepoxides with N-(aminoalkyl)piperazine. Lee, Henry and Neville, Chris, Handbook of Epoxy Resins, McGraw-Hill Book Company, N.Y., 1967, at pp. 10-11, describe the use of salicylic as an accelerator for DGEBRA/imidazoline blends.

Although in Modern Plastics, supra, it has been taught that no additional catalyst, hardening agents, or curing agents are necessary for preparing epoxy resins with such polyamides, we have found that curing epoxy resins with the stated polyamides is disappointingly slow in those applications requiring ambient temperature cures, such as in seamless flooring.

Accordingly, we are unaware of any satisfactory curing compositions that have heretofore been described using such polyamides that actually meet the needs of the practitioner, i.e. to cure at ambient temperatures.

We have now surprisingly found that if an accelerator-hardener composition containing salicylic acid and N-(3-aminopropyl)piperazine is used in combination with a polyamide to cure a polyepoxide resin, accelerated cures at times faster than would be predicted from use of the individual components alone, even at ambient temperatures, are obtained.

Further, we found solventless polyepoxide coatings prepared by employing the accelerator-hardener composition of this invention provide a cured polyepoxide coating that is smoother, glossier and freer from blush than similar coatings cured with the polyamide alone.

Therefore, in accordance with our invention, a polyepoxide resin composition that cures itself at ambient temperatures is provided. The self-curable resin thus contains a conventional epoxy resin, a polyamide, salicylic acid and N-(3-aminopropyl)piperazine.

Further, in accordance with our invention, a self-curable solventless coating composition is provided that contains in addition to the polyepoxy resin an accelerator-hardener composition containing a polyamide, N-(3-aminopropyl)piperazine and salicylic acid.

Epoxy resins in general may be used in the present invention. Illustrative of suitable epoxy resins are the polyglycidyl ethers of mononuclear polyhydric phenols or polynuclear polyhydric phenols.

The polyglycidyl ethers of the bis(hydroxyphenyl) alkanes are particularly desirable, as for example, the diglycidyl ether of 2,2-bis(p-hydroxyphenyl)propane, the diglycidyl ether of bis(p-hydroxyphenyl)methane, and the like. Other exemplary epoxy resins are enumerated in Epoxy Resins, Report No. 38, the Stanford Research Institute, June 1968, which report is herein incorporated by reference thereto. The epoxy resins can be further depicted as having an epoxy equivalency of greater than one.

Suitable polyamides that can be employed in our invention can be formed from polymerized fatty acids, and esters thereof, such as the vegetable oil acids, and esters thereof, with polyalkylpolyamines. U.S. Pats. Nos. 2,379,413 and 2,705,223 describe exemplary processes for preparing suitable polyamides. Polyamide compositions well suited for use in this invention are further described in Modern Plastics and Polyamide Resins, supra.

Suitable polymeric fatty acids that can be used in preparing the polyamides are those resulting from the polymerization of drying or semi-drying oils. The free acids, or the simple aliphatic alcohol ethers (i.e., methyl, ethyl, propyl) of such acids can be employed. Exemplary drying or semi-drying oils include soybean, linseed, tung, perila, cottonseed, oiticica, tall, sunflower, safflower, dehydrated castor oil, and the like. The term "polymeric fatty acid" as used herein is intended to include polymerized mixtures of acids, which mixtures preferably contain a predominant portion of dimeric acids, a smaller quantity of trimeric and higher polymeric acids and some residual monomer. Dimerized linolenic acid is most preferred.

Polyalkylenepolyamines, in general, can be used with the polymeric fatty acids to prepare the aforementioned polyamide. Exemplary polyamines suitable for use are diethylenetriamine, triethylenetetramine, tetraethylenepentamine, 1,4-diaminobutane, 1,3-diaminobutane, hexamethylenediamine, mixtures thereof, and the like.

It is preferred that the polyamides employed according to this invention, which are prepared from the condensation of polymeric fatty acids and polyalkylenepolyamines, have an amine value in the range of about 80 to 375. The amount of free amine groups of the polyamide can be determined conventionally by titration. The amine number is accordingly defined as the number of milligrams of potassium hydroxide equivalent to the free amine groups present in one gram of the resin.

In preparing the self-curable epoxy resin compositions of this invention, the order of mixing is not critical. For example, the polyamide, salicylic acid and N-(3-aminopropyl)piperazine can be blended in any desired order to give homogeneous curing agent which is subsequently admixed with the epoxy resin at the time of use.

Another convenient method to practice this invention is to mix the salicylic acid with the N-(3-aminopropyl)piperazine to form a clear stable liquid free of crystals or solids which can be stored for an indefinite period of time. This clear stable liquid can then be blended with the polyamide and the polyepoxy resin at the time of use. Conventional diluents, solvents and other additives, such as fillers, dyes, plasticizers, and the like, can be added to the composition of this invention, if so desired.

Ambient curing temperatures can be suitably employed to provide a self-cured resin such as from about 0° C. to about 45° C. Post cures at higher temperatures are optional.

The cured epoxy resins have myriad uses. Exemplary uses include preparation of seamless flooring, terrazzo flooring, protective coatings, adhesives, laminates, reinforced composites, flexible printing inks, groutings, castings, pottings, encapsulations, patches, caulkings, sealing compositions, and the like. As hereinbefore stated, solventless coatings prepared with the accelerator-hardener composition of this invention can be employed to prepare cured coatings which are smoother, glossier and freer from blush than similar coatings cured only with the polyamide.

The salicylic acid and N-(3-aminopropyl)piperazine are employed in such amounts that from about .1 to 1 part by weight of salicylic acid is employed per each part by weight N-(3-aminopropyl)piperazine, preferably about .2 to .5, more preferably about .3 to .4, part by weight of salicylic acid is employed per each part by weight of N-(3-aminopropyl)piperazine employed.

The salicylic acid and N-(3-aminopropyl)piperazine are collectively employed in such amounts that from about .02 to about .5 part by weight of the combination are employed per each part by weight of the polyamide. Preferably, about .05 to .3, and more preferably about .1 to .25 part by weight of the salicylic acid and N-(3-aminopropyl)piperazine combination is employed per each part by weight of the polyamide.

In determining the collective amounts of the N-(3-aminopropyl)piperazine and polyamide to be employed in relationship to the epoxy resin, it is convenient to discuss such amounts in terms of stoichiometric quantities. For purposes of the stoichiometric calculations one epoxy group of the epoxy resin is deemed to react with each amino hydrogen atom collectively contained in the N-(3-aminopropyl)piperazine and polyamide. Accordingly, each epoxy group and each amino hydrogen atom will be referred to as an epoxy equivalent and an amino hydrogen equivalent, respectively.

Optimum properties of the cured polyepoxide composition are generally achieved using about stoichiometric quantities wherein the amino hydrogen equivalents essentially equal the epoxy equivalents. Generally, the equivalents of active amino hydrogen collectively provided by the N-(3-aminopropyl)piperazine and the polyamide are in the range of about .75 to about 1.25 per each epoxy equivalent of the epoxy resin. Preferably about .9 to 1.1 equivalents of active amino hydrogen contained in N-(3-aminopropyl)piperazine and the polyamide are provided per each epoxy equivalent of the epoxy resin.

The optimum amounts for any given application can vary considerably, but it is well within the skill of the art to determine such an effective amount.

Illustrative of the foregoing discussion and description, and not to be interpreted as a limitation on the scope thereof, or on the materials herein employed, the following examples are presented.

EXAMPLES I-IV

Epoxy resin compositions were formulated as shown in Table 1 by admixing the reported components at 25° C. The gel time or time required for a solid to begin to form is reported in each case.

TABLE 1

| Example No. | Formulations (parts by weight) | | | | Results: gel time, minutes |
|---|---|---|---|---|---|
| | Ex-resin [a] | Polyamide [b] | SA [c] | APP [d] | |
| 1 | 164 | 68.5 | | | 150 |
| 2 | 164 | 68.6 | 3.4 | | 51 |
| 3 | 164 | 55 | | 8.3 | 60 |
| 4 | 164 | 55 | 2.75 | 8.25 | 30 |

[a] The diglycidyl ether of isopropylidenediphenol having an equivalent weight per epoxide of 191.
[b] An amino-terminated polyamide formed from dilinolenic acid and diethylenetriamine having an amine value of approximately 375.
[c] Salicylic acid.
[d] N-(3-aminopropyl)piperazine.

The foregoing examples effectively demonstrate the synergistic effects of the accelerator-hardener composition of this invention. The combination of N-(3-aminopropyl)piperazine and salicylic acid with the polyamide were approximately twice as effective in reducing gel time as either one alone with the polyamide.

EXAMPLES V-VI

Epoxy resin compositions were formulated as shown in Table 2 by admixing the reported components at 25° C. The compositions were coated on a steel test panel by means of a 6 ml. applicator blade and allowed to cure at room temperature (about 25° C.) while being timed for two stages of drying by means of a Gardner circular drying time recorder. The formulations and results are reported in Table 2.

TABLE 2

| Example No. | Formulations (parts by weight) | | | | Results, hours | |
|---|---|---|---|---|---|---|
| | E-resin [a] | Polyamide [a] | SA [a] | APP [a] | STT [b] | TDT [c] |
| 5 | 33 | 14 | | | 7.0 | 11.0 |
| 6 | 30 | 10 | 1.5 | 0.5 | 3.8 | 6.2 |

[a] As reported in Table 1.
[b] Set-to-touch time, hours.
[c] Through-dry time, hours.

The foregoing examples effectively demonstrate that the accelerator-hardener composition of the invention reduces the time to reach the set-to-touch stage by about 46% and the time to reach the through-dry stage by 44%, when compared to use of the polyamide curing agent alone. Further, the coatings prepared in Example VI were clearly smoother and glossier than the coatings prepared in Example V, thus demonstrating that solventless coatings employing the accelerator-hardener curing composition of the invention are superior to those epoxy coatings cured with the polyamides alone.

The preceding examples can be repeated with similar success by substituting the generically and specifically described reactants and conditions of this invention for those employed in the examples. As will be evident to those skilled in the art, various modifications of this invention can be made or followed in light of the discussion and disclosure herein set forth without departing from the spirit or the scope thereof.

What is claimed is:

1. A self-curable polyepoxy resin composition comprising:
   (a) polyepoxy resin having an epoxy equivalency of greater than one;
   (b) a polyamide having an amine value in the range of about 80 to 375 formed from a polyalkylenepolyamine and a polymeric fatty acid or lower alkyl ester thereof;
   (c) salicylic acid; and
   (d) N-(3-aminopropyl)piperazine;

wherein from about .1 to 1 part by weight of salicylic acid is provided per each part by weight of N-(3-aminopropyl)piperazine, wherein the collective total parts by weight of the salicylic acid and N-(3-aminopropyl)piperazine are in the range of about .02 to about .5 part by weight per each part by weight of said polyamide, and wherein the N-(3-aminopropyl)piperazine and polyamide are collectively provided in an amount to provide from about .75 to 1.25 equivalents of active amino hydrogen for each epoxy equivalent of said polyepoxy resin.

2. The composition according to claim 1 wherein from about .2 to .5 part by weight of salicylic acid is provided per each part by weight of N-(3-aminopropyl)piperazine; wherein the collective total parts by weight of the salicylic acid and N-(3-aminopropyl)piperazine are in the range of about .05 to .3 part per each part by weight of said polyamide; and wherein the polyamide and the N-(3-aminopropyl)piperazine are collectively provided in an amount to provide from about .9 to 1.1 equivalents of active amino hydrogen per each epoxy equivalent of said epoxy resin.

3. The composition according to claim 2 wherein from about .3 to .4 part by weight of salicylic acid is provided per each part by weight of N-(3-aminopropyl)piperazine, and wherein from about .1 to .25 part by weight of salicylic acid and N-(3-aminopropyl)piperazine are collectively provided per each part by weight of said polyamide.

4. The composition according to claim 3 wherein said polyepoxy resin is the diglycidyl ether of isopropylidenediphenol, and wherein said polyamide is the reactive product of dilinoleic acid and diethylenetriamine.

5. The cured epoxy resin of the composition of claim 1.

6. The cured epoxy resin of the composition of claim 4.

7. An epoxy resin accelerator-hardener curing composition comprising:
(a) a polyamide having an amine value in the range of about 80 to 375 formed from a polyalkylenepolyamine and a polymeric fatty acid, or lower alkyl ester thereof;
(b) salicylic acid; and
(c) N-(3-aminopropyl)piperazine;

wherein from about .1 to about 1 part by weight of salicylic acid is provided per part by weight of N-(3-aminopropyl)piperazine; wherein the collective total parts by weight of salicylic acid and N-(3-aminopropyl)piperazine provided are within the range of about .02 to .5 part by weight per each part by weight of polyamide.

8. The composition according to claim 7 wherein from about .2 to .5 part by weight of salicylic acid is provided per each part by weight of N-(3-aminopropyl)piperazine, and wherein from about .05 to .3 total part by weight of salicylic acid and N-(3-aminopropyl)piperazine is provided per each part by weight of polyamide.

9. The composition according to claim 8 wherein from about .3 to .4 part by weight of salicylic acid is employed per each part by weight of N-(3-aminopropyl)piperazine, and wherein the total weight of the salicylic acid and N-(3-aminopropyl)piperazine are sufficient to provide from about .1 to .25 part by weight per each part by weight of polyamide.

10. A process for accelerating the cure of an epoxy resin having an epoxy equivalency of greater than one comprising incorporating therein an effective amount of the accelerator-hardener composition of claim 7.

11. The process according to claim 10 wherein said polyepoxide is the diglycidyl ether of isopropylidenediphenol and said polyamide is the reaction product of dilinoleic acid and diethylenetriamine.

References Cited
UNITED STATES PATENTS 3,639,928   2/1972   Bentley et al. _____ 260—47

FOREIGN PATENTS 711,305   6/1965   Canada _____ 260—18

DONALD E. CZAJA, Primary Examiner

E. C. RZUCIDLO, Assistant Examiner

U.S. Cl. X.R.

260—18 EP, 47 EC, 47 EN, 830 P